US012558750B2

(12) United States Patent
Skrna et al.

(10) Patent No.: US 12,558,750 B2
(45) Date of Patent: Feb. 24, 2026

(54) SYSTEM AND METHOD FOR TRANSFERRING A PART BEING MACHINED

(71) Applicant: FANUC AMERICA CORPORATION, Rochester Hills, MI (US)

(72) Inventors: Paul Skrna, Orion, MI (US); Patrick A. Gray, Waterford, MI (US); Benjamin J. Delisle, Ortonville, MI (US)

(73) Assignee: FANUC AMERICA CORPORATION, Rochester Hills, MI (US)

( * ) Notice: Subject to any disclaimer, the term of this patent is extended or adjusted under 35 U.S.C. 154(b) by 0 days.

(21) Appl. No.: 18/591,376

(22) Filed: Feb. 29, 2024

(65) Prior Publication Data

US 2024/0198469 A1 Jun. 20, 2024

Related U.S. Application Data

(63) Continuation-in-part of application No. 18/459,648, filed on Sep. 1, 2023.

(60) Provisional application No. 63/374,837, filed on Sep. 7, 2022.

(51) Int. Cl.
*B23Q 3/16* (2006.01)
*B23Q 3/06* (2006.01)

(52) U.S. Cl.
CPC .............. *B23Q 3/16* (2013.01); *B23Q 3/066* (2013.01); *B23Q 2716/08* (2013.01)

(58) Field of Classification Search
CPC ....... B23Q 3/16; B23Q 3/066; B23Q 2716/08
See application file for complete search history.

(56) References Cited

U.S. PATENT DOCUMENTS 3,999,645 A * 12/1976 Kaulfuss .................. B23Q 7/02
198/408
5,081,889 A * 1/1992 Takano .................. B23Q 7/048
82/122

* cited by examiner

*Primary Examiner* — Nirvana Deonauth
(74) *Attorney, Agent, or Firm* — John A. Miller; Shumaker, Loop & Kendrick, LLP

(57) ABSTRACT

A system and method for transferring a part being machined from a first fixture to a second fixture so that an un-machined side of the part can be exposed for machining, where the first fixture is secured to a first actuator and the second fixture is secured to a second actuator. The method includes securing the part to the first fixture and machining the part on sides of the part except a side of the part coupled to the first fixture. The method slides the first actuator away from the second actuator, operates the first actuator and the second actuator so that the part secured to the first fixture is aligned with the second fixture, slides the first actuator back towards the second actuator, secures the part to the second fixture and releases the part from the first fixture, and slides the first actuator away from the second actuator again.

8 Claims, 5 Drawing Sheets

SYSTEM AND METHOD FOR TRANSFERRING A PART BEING MACHINED

CROSS-REFERENCE TO RELATED APPLICATIONS

This application is a continuation-in-part (CIP) application of application Ser. No. 18/459,648, titled, In-Process Part Machining Orientation Change/Index, filed Sep. 1, 2023, which claims the benefit of the filing date of U.S. Provisional Application 63/374,837, titled, In-Process Part Machining Orientation Change/Index, filed Sep. 7, 2022.

BACKGROUND

Field

This disclosure relates generally to a system and method for transferring a part being machined from one fixture to another fixture and, more particularly, to a system and method for transferring a part being machined from one fixture to another fixture using aligned rotary actuators so that an un-machined side of the part secured to the one fixture can be exposed for machining, where the one fixture is mounted to a slide.

Discussion of the Related Art

When machining a part for a particular application, for example, removing metal for shaping a part from a part blank, drilling holes in a part, etc., the part is placed in a fixture in a machine, such as a CNC machine, lathe, etc., either manually or by a robot that picks the part or a part blank from, for example, a bin of parts. The part is held by the fixture at one side of the part by, for example, a mechanical chuck or a pneumatic device, which allows access to all other sides of the part by the machine, such as five sides of the part if the part is a cube. A machine tool or tools movable in the X-Y-Z directions are used to machine the part while it is being held by the fixture. The fixture can be secured to an actuator that rotates the part both clockwise and counter-clockwise in, for example, the Y-direction, thus providing another axis of freedom for machining. An additional fixture coupled to a rotary actuator can also be provided that rotates the part in the X-direction. A computer controlled operation controls the tool and the actuator to machine the part in the desired manner from all angles.

When machining of the part is so far complete, it is generally then necessary to machine the part on the side that is being held by the fixture. To do this, the part is removed from the fixture either manually or by a robot, flipped and then replaced in the fixture so that it is held at an already machined side of the part so that the tool now has access to the un-machined side. Alternately, the partially machined part can be placed in another fixture in the same machine so that the tool has access to the un-machined side or placed in a fixture of a different machine. It may be desirable for efficiency, reduction of machining time, reduction of expense, etc. to simplify the step of changing the part out from one fixture to another fixture to machine the side of the part held by the one fixture.

SUMMARY

The following discussion discloses and describes a system and method for transferring a part being machined from a first fixture to a second fixture so that an un-machined side of the part can be exposed for machining, where the first fixture is secured to a first actuator and the second fixture is secured to a second actuator. The method includes securing the part to the first fixture and machining the part on sides of the part except a side of the part coupled to the first fixture. The method slides the first actuator away from the second actuator, operates the first actuator and the second actuator so that the part secured to the first fixture is aligned with the second fixture, slides the first actuator back towards the second actuator, secures the part to the second fixture and releases the part from the first fixture, and slides the first actuator away from the second actuator again. The method then machines the side of the part that was not able to be machined when the part was coupled to the first fixture.

Additional features of the disclosure will become apparent from the following description and appended claims, taken in conjunction with the accompanying drawings.

DETAILED DESCRIPTION OF THE
EMBODIMENTS

The following discussion of the embodiments of the disclosure directed to a system and method for transferring a part being machined by a machine from one fixture to another fixture using aligned actuators so that an un-machined side of the part can be exposed for machining, where one of the fixtures is mounted to a slide, is merely exemplary in nature, and is in no way intended to limit the disclosure or its applications or uses.

Figures 1, 2:
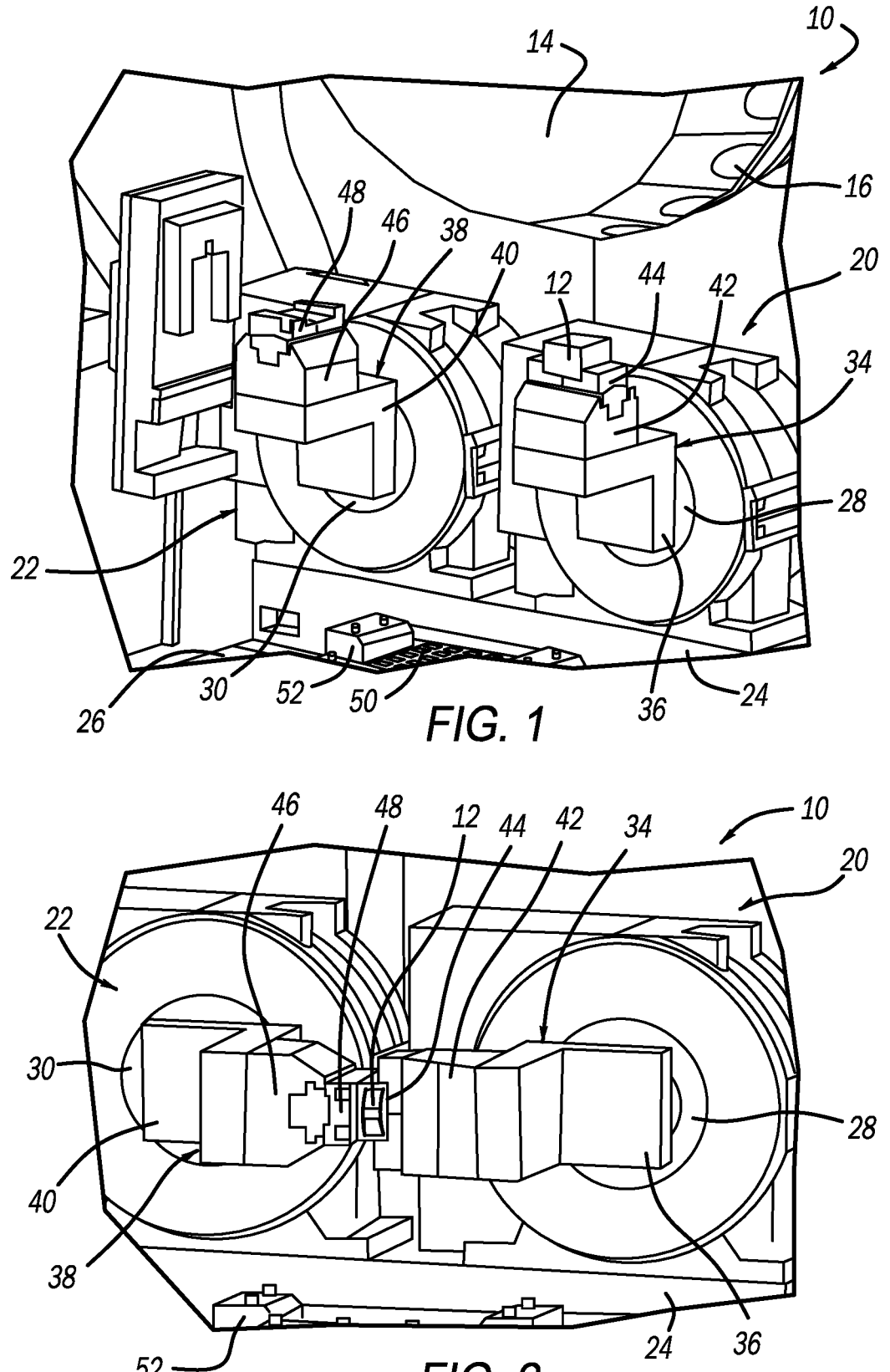
FIG. 1 is a cut-away isometric view of a machine for machining a part, where the machine includes two fixtures that are rotatable and configured relative to each other to transfer the part from one fixture to the other fixture so that an un-machined side of the part secured to the one fixture can be exposed for machining when the part is secured to the other fixture.
FIG. 2 is a cut-away isometric view of the machine illustrated in FIG. 1 showing the fixtures being oriented relative to each other to transfer the part from the one fixture to the other fixture.

FIG. 1 is a cut-away isometric view of a machine 10 for machining parts, for example, part 12. The machine 10 is intended to represent any CNC machine, lathe, drill, etc. suitable for machining the part 12 in a desirable manner consistent with the discussion herein. The machine 10 includes a rotary tool holder assembly 14 that holds various tools (not shown), such as cutting tools, drilling tools, etc., in tool holders 16 around its perimeter for machining the part 12, where the tool holder assembly 14 may be operable to be controlled in the X-Y-Z directions. The machine 10 also includes side-by-side rotary actuators 20 and 22 mounted to a common block 24 sitting on a table 26 that add two more control axes to the machine 10, where the actuator 20 rotates a circular member 28 in both the clockwise and counter-clockwise directions and the actuator 22 rotates a circular member 30 in both the clockwise and counter-clockwise directions, here along the Y-axis. The table 26 is also movable along both the X and Y-axis. The machine 10 also includes a fixture 34 having a fixture holder 36 mounted to the member 28 and a fixture 38 having a fixture holder 40 mounted to the member 30. The fixture 34 also includes a vise 42 having vise jaws 44 mounted to the fixture holder 36 and the fixture 38 also includes a vise 46 having vise jaws 48 mounted to the fixture holder 40, where the jaws 44 and 48 are operable to hold and release the part 12 while it is being machined. In this non-limiting embodiment, the vices 42 and 46 are oriented 90° relative to each other. The part 12 is shown in FIG. 1 secured to the fixture 34 in an upright position to be ready to be machined by a tool. The part 12 is loaded into the fixture 34 as a part blank 50 from a bin 52 of the blanks 50 either manually or by a robot (not shown), where the bin 52 is also sitting on the table 26.

Figure 3:
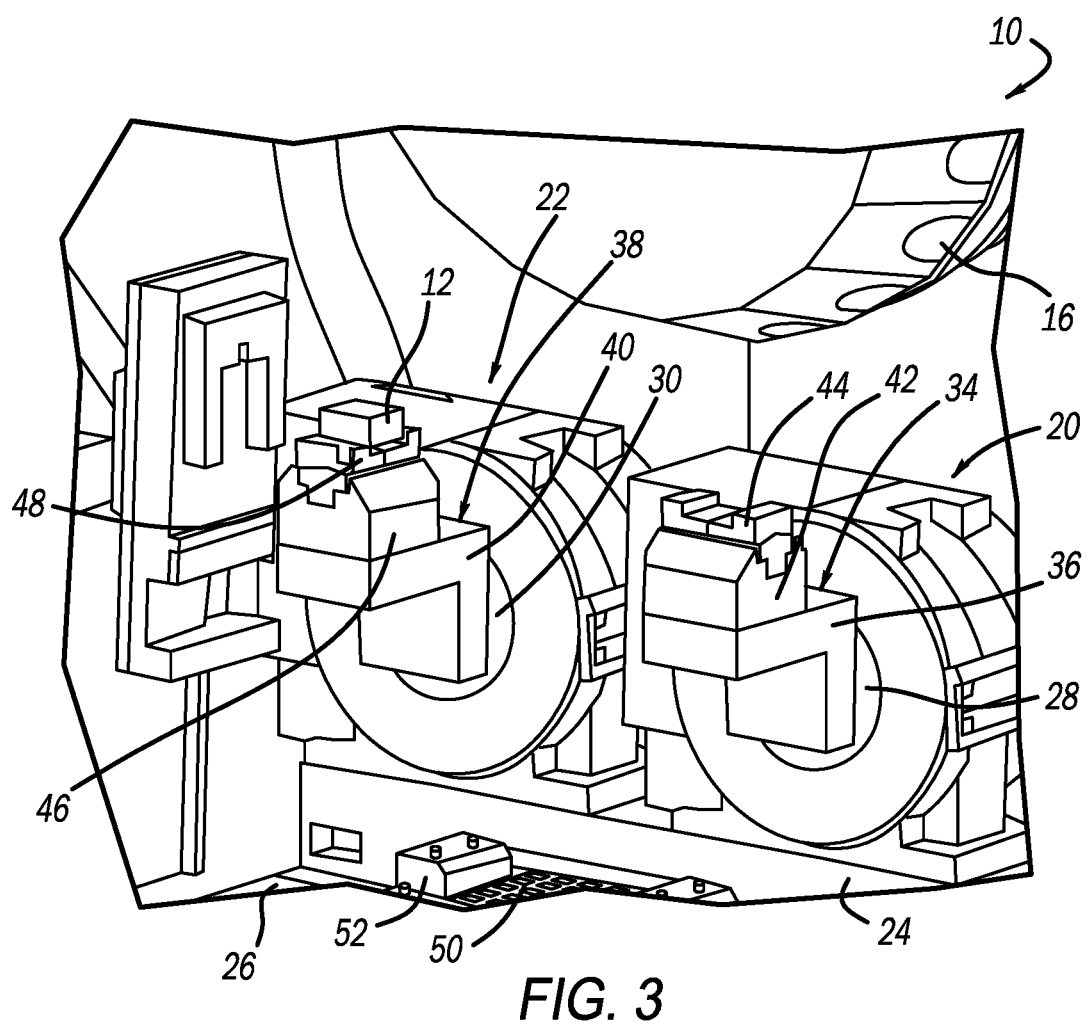
FIG. 3 is a cut-away isometric view of the machine illustrated in FIG. 1 after the part has been transferred from the one fixture to the other fixture.
Figure 4:
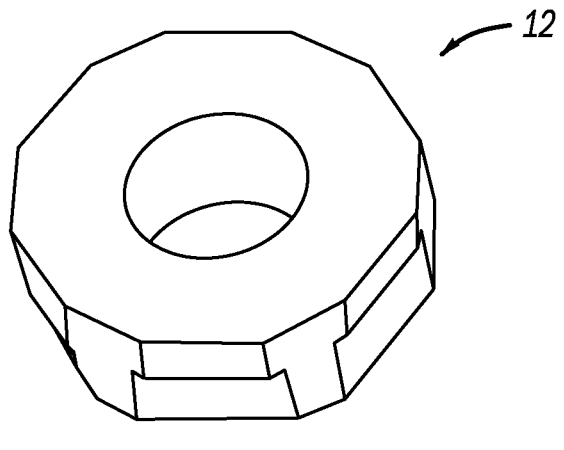
FIG. 4 is a cut-away isometric view of an example of the part after it has been machined.

Once the part 12 has been machined on all sides except the side being held by the fixture 34, the actuator 20 rotates the fixture 34 90° counter-clockwise and the actuator 22 rotates the fixture 38 90° clockwise, as shown in FIG. 2. The actuators 20 and 22 are positioned and configured on the table 24 so that when rotated in this manner the part 12 aligns with and touches the vise jaws 48 on the fixture 38 at an already machined side of the part 12. The vise jaws 48 are then engaged to hold the part 12 and the vise jaws 44 are disengaged to release the part 12. The actuator 20 then rotates the fixture 34 90° clockwise and the actuator 22 rotates the fixture 38 90° counter-clockwise so that the part 12 is now upright in the fixture 38 as shown in FIG. 3 so that the un-machined side of the part 12 is accessible and can be machined by a tool. FIG. 4 is an isometric view of a representative example of the part 12 after it has been machined.

As mentioned, the machine 10 is merely an exemplary illustration of a machine suitable for the purposes described herein. Other machines having other orientations of fixtures, such as stacked fixtures, fixtures rotatable in the X or Z-axis, etc., can also be used within the scope of this disclosure that can be configured and oriented to transfer a part from one fixture to another fixture to machine an un-machined side of the part as described. For example, the actuators 20 and 22 could be stacked and oriented along the Z-axis, providing a five-axis machine, and still be configured to transfer the part in this manner.

For the embodiment described above, when the fixtures 34 and 38 are rotated to face each other to exchange the part 12 from the fixture 34 to the fixture 38 as described, the fixtures 34 and 38 need to be very precisely aligned along the Y-axis. If this precision is not maintained, then the exchange of the part 12 could be compromised. According to another embodiment, one of the fixtures is slidable relative to the other fixture to provide reduced alignment precision requirements.

Figures 5, 6:
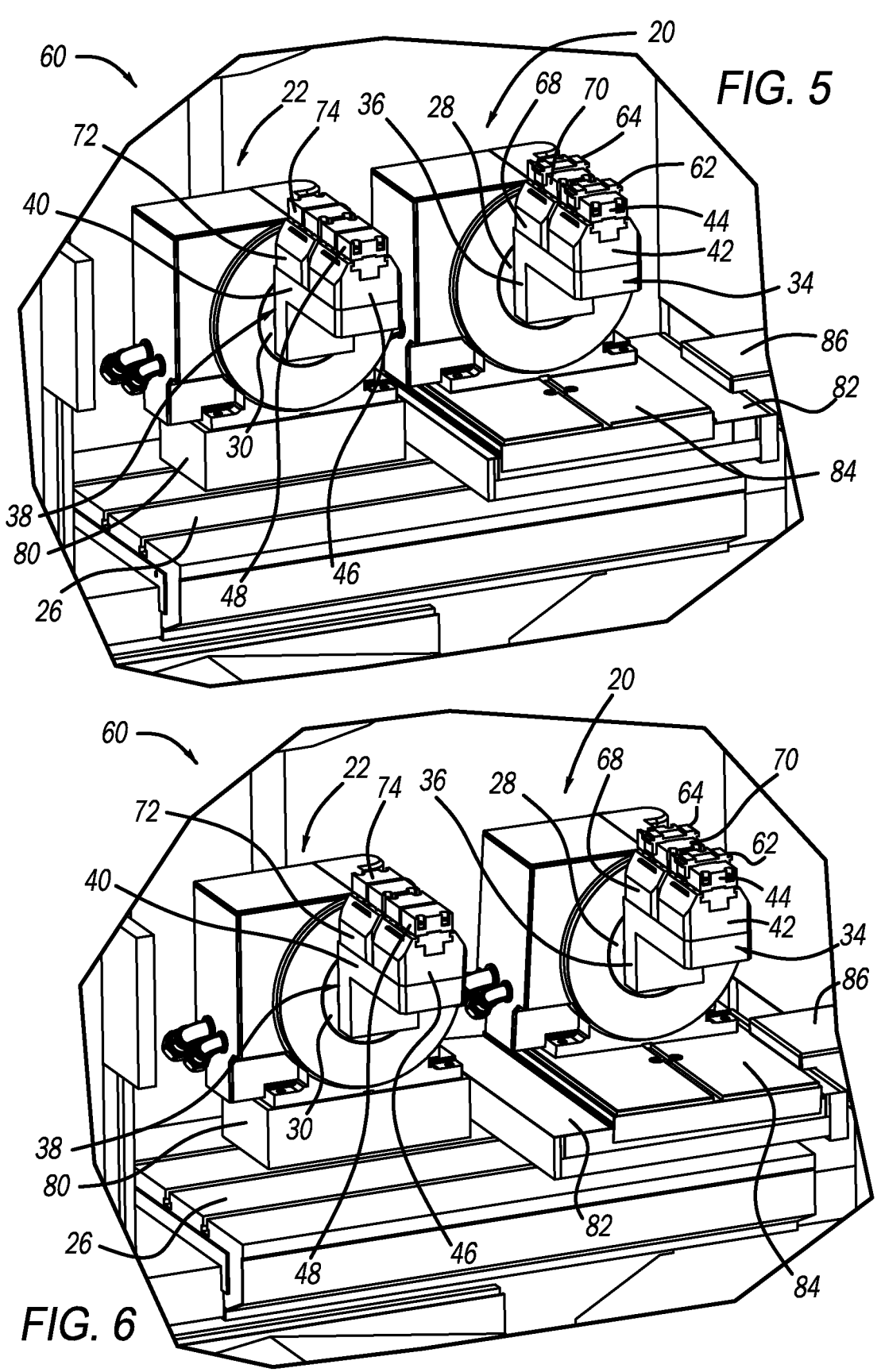
FIG. 5 is a cut-away isometric view of a machine for machining a part, where the machine includes two fixtures that are rotatable and configured relative to each other to transfer the part from one fixture to the other fixture so that an un-machined side of the part secured to the one fixture can be exposed for machining when the part is secured to the other fixture, and where one of the fixtures is mounted to a slide.
FIG. 6 is a cut-away isometric view of the machine illustrated in FIG. 5 showing one fixture being slid away from the other fixture and with the fixtures in an upright position and the one fixture holding the part.

FIG. 5 is a cut-away isometric view of a machine 60 for machining parts 62 and 64 illustrating such an embodiment, where like elements are identified by the same reference number. In this design, the fixture 34 includes another vice 68 having vice jaws 70 secured to the fixture holder 36 adjacent to the vice 42 and the fixture 38 includes another vice 72 having vice jaws 74 secured to the fixture holder 40 adjacent to the vice 46, where the vices 42 and 46 hold the part 62 and the vices 68 and 72 hold the part 64. In this non-limiting embodiment, the vices 42, 46, 68 and 72 are oriented in the same direction. Additionally, the block 24 is replaced with a stationary block 80 that only the rotary actuator 22 sits on. The rotary actuator 20 sits on a slide block 82 that is mounted to the table 26, where the slide block 82 includes a slide 84 that operates to move the rotary actuator 20 along the Y-axis using a servomotor 86.

Figures 7, 8:
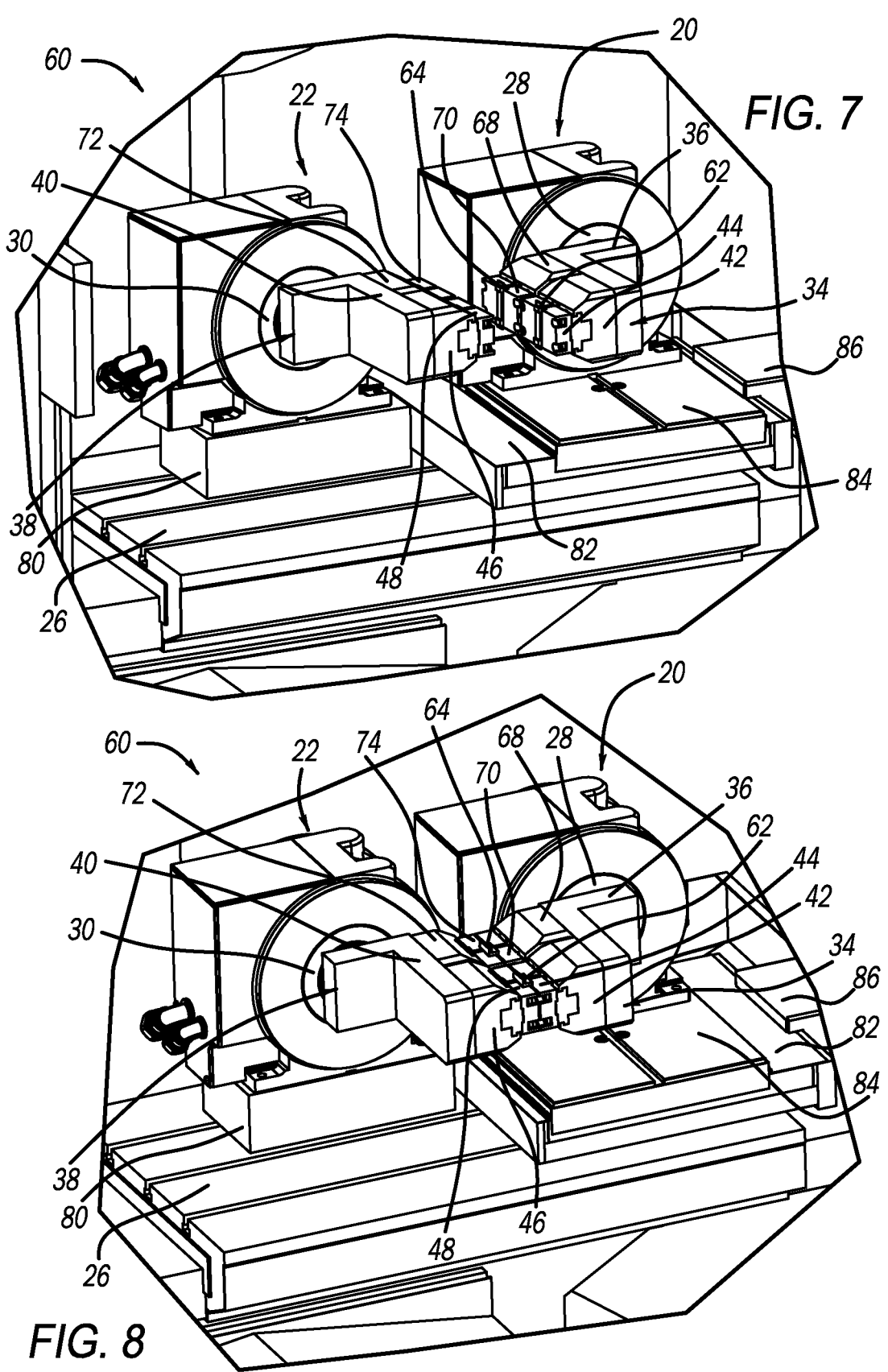
FIG. 7 is a cut-away isometric view of the machine illustrated in FIG. 5 showing the one fixture being slid away from the other fixture and with the fixtures rotated to face each other and the one fixture holding the part.
FIG. 8 is a cut-away isometric view of the machine illustrated in FIG. 5 showing the one fixture being slid toward the other fixture and with the fixtures facing each other to exchange the part from the one fixture to the other fixture.
Figures 9, 10:
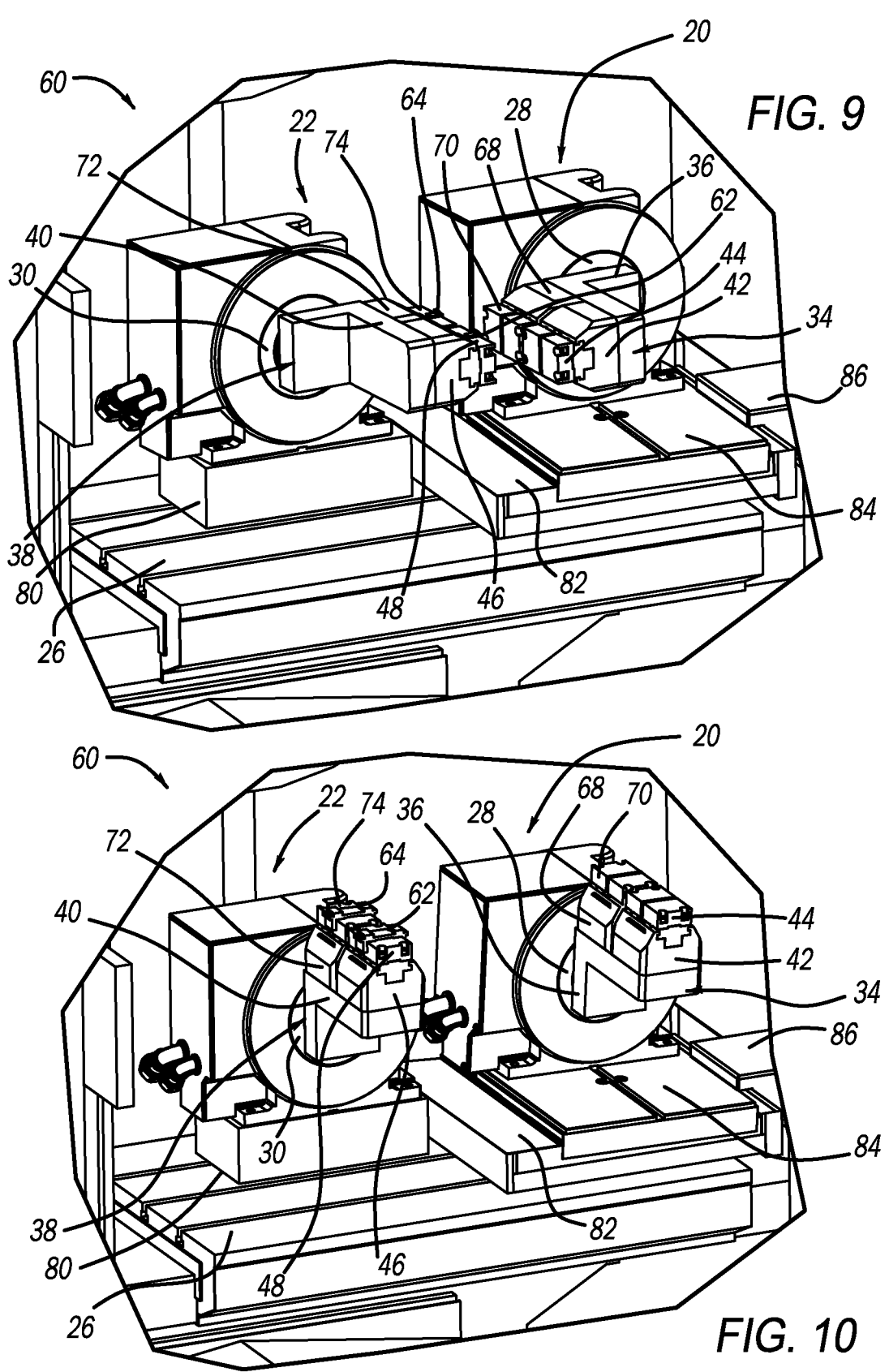
FIG. 9 is a cut-away isometric view of the machine illustrated in FIG. 5 showing the one fixture being slid away from the other fixture and with the fixtures rotated to face each other and the other fixture holding the part.
FIG. 10 is a cut-away isometric view of the machine illustrated in FIG. 5 showing the fixtures in an upright position.

FIG. 5 shows the machine 60 in an initial position after the parts 62 and 64 have been loaded into the vices 42 and 68, respectively. In this position, the slide 84 is at the side of the slide block 82 closest to the actuator 22. As above, the parts 62 and 64 are machined on all sides except the side being held by the vices 42 and 68. The slide 84 is then operated by the servomotor 86 to slide the actuator 20 away from the actuator 22 along the Y-axis, as shown in FIG. 6. As also above, the actuator 20 rotates the fixture 34 90° counter-clockwise and the actuator 22 rotates the fixture 38 90° clockwise, as shown in FIG. 7. Because the actuator 20 is slid away from the actuator 22, the parts 62 and 64 do not contact the vice jaws 48 and 70 in this position. The slide 84 is then operated to slide the actuator 20 back towards the actuator 22, as shown in FIG. 8. The actuators 20 and 22 are positioned and configured so that when the slide 84 is slid back towards the actuator 22, the part 62 aligns with and touches the vise jaws 48 on the fixture 38 at an already machined side of the part 62 and the part 64 aligns with and touches the vise jaws 74 on the fixture 38 at an already machined side of the part 64. The vise jaws 48 are then engaged to hold the part 62 and the vise jaws 44 are disengaged to release the part 62, and the vise jaws 74 are engaged to hold the part 64 and the vise jaws 70 are disengaged to release the part 64. The slide 84 is again operated by the servomotor 86 to slide the actuator 20 away from the actuator 22, as shown in FIG. 9. The actuator 20 then rotates the fixture 34 90° clockwise and the actuator 22 rotates the fixture 38 90° counter-clockwise so that the parts 62 and 64 are now upright in the fixture 38 as shown in FIG. 10 so that the un-machined side of the parts 62 and 64 are accessible and can be machined.

The foregoing discussion discloses and describes merely exemplary embodiments of the present disclosure. One skilled in the art will readily recognize from such discussion and from the accompanying drawings and claims that various changes, modifications and variations can be made therein without departing from the spirit and scope of the disclosure as defined in the following claims.

What is claimed is:

1. A method for transferring a part being machined from a first fixture to a second fixture, said first fixture being mounted to a first actuator and said second fixture being mounted to a second actuator, said method comprising:

securing the part to the first fixture so that a side of the part coupled to the first fixture is not able to be machined;

machining the part while the part is secured to the first fixture;

sliding the first actuator away from the second actuator;

operating the first actuator and the second actuator so that the part secured to the first fixture is aligned with the second fixture;

sliding the first actuator towards the second actuator;

securing the part to the second fixture and releasing the part from the first fixture;

sliding the first actuator away from the second actuator again; and machining the side of the part that was not able to be machined when the part was coupled to the first fixture.

2. The method according to claim 1 wherein the first and the second actuators are rotary actuators.

3. The method according to claim 2 wherein the first and the second actuators are positioned side-by-side.

4. The method according to claim 3 wherein operating the first actuator and the second actuator so that the part secured to the first fixture is aligned with the second fixture includes rotating the first actuator 90° from an upright position clockwise or counter-clockwise and rotating the second actuator 90° from an upright position the opposite clockwise or counter-clockwise.

5. The method according to claim 4 wherein machining the side of the part that was not able to be machined when the part was coupled to the first fixture includes rotating the second actuator to the upright position.

6. The method according to claim 2 wherein machining the part includes using a tool movable in the X-Y-Z directions, and wherein the first and the second actuators rotate in the Y direction and the first actuator slides in the Y direction.

7. The method according to claim 2 wherein machining the part includes using a tool movable in the X-Y-Z directions, and wherein the first and the second actuators rotate in the Z direction.

8. The method according to claim 1 wherein the first fixture and the second fixture include a vise for holding the part.

\* \* \* \* \*